United States Patent [19]

Feinland et al.

[11] 4,231,662
[45] Nov. 4, 1980

[54] PHASE SHIFT CORRECTION FOR DISPLACEMENT MEASURING SYSTEMS USING QUADRATURE

[75] Inventors: Seymour Feinland, Stamford; David Kleinschmitt, South Norwalk, both of Conn.

[73] Assignee: Pitney Bowes Inc., Stamford, Conn.

[21] Appl. No.: 940,265

[22] Filed: Sep. 7, 1978

[51] Int. Cl.³ .................... G01B 11/14; H01J 3/14
[52] U.S. Cl. ................... 356/373; 356/375; 250/237 G
[58] Field of Search .............. 356/373, 374, 375; 250/237 G, 231 R

[56] References Cited

U.S. PATENT DOCUMENTS

| | | | |
|---|---|---|---|
| 3,487,399 | 12/1969 | Wogatzke | 250/237 R |
| 3,748,486 | 7/1973 | Russell | 250/237.6 |
| 4,078,173 | 3/1978 | Fultz | 356/375 X |

*Primary Examiner*—Vincent P. McGraw
*Assistant Examiner*—Rodney B. Bovernick
*Attorney, Agent, or Firm*—Robert E. Meyer; William D. Soltow, Jr.; Albert W. Scribner

[57] ABSTRACT

Method and apparatus are disclosed for increasing accuracy of optical phase shift in quadrature systems by varying the angle at which light is directed through pairs of diffraction gratings. A more precise adjustment of the phase angle between two adjacent index gratings is achieved after manufacturing and assembly by using a light source and diverging or converging its rays of light. The accuracy of the phase shift of resultant signals is greatly improved over methods of mechanical alignment heretofore used. The improved accuracy allows for the manufacture of a broad tolerance system, with the inherent reduction of costs.

5 Claims, 8 Drawing Figures

PHASE SHIFT CORRECTION FOR DISPLACEMENT MEASURING SYSTEMS USING QUADRATURE

FIELD OF THE INVENTION

The invention relates to a displacement measuring system and more particularly to an optical measuring system utilizing pairs of superimposed Ronchi rulings which generate moire optical interference patterns.

BACKGROUND OF THE INVENTION

In U.S. Pat. No. 4,044,847 a weighing scale is shown having an optical system for sensing tare deflection by generating a moire fringe pattern indicative of the amount of load weight. The movement of the fringe pattern is sensed by a moire optical electrical transducer unit to which are attached four photodetectors. Each the photodetectors are placed effectively 90° apart from each adjacent photodector as measured with respect to the cyclic moire interference pattern which moves across the photodector array. (Therefore, it can be said that the first photodetector "sees" the center of a moire fringe line while the next two detectors see opposite side edges of other such lines and the fourth detector sees the light space between such lines.) With this arrangement when the relative angle phases are 0°, 90°, 180° and 270°, between detectors, an optimum condition known as quadrature is created. Aligning all four photodetectors substantially 90° of angle phase apart, as required by the above-mentioned invention, is an extremely costly and time-consuming operation.

The present invention eliminates the aforementioned drawback of the prior system and like systems by providing a method for correcting inaccuracies inherent in broad-based tolerance manufacturing.

SUMMARY OF THE INVENTION

The present invention relates to a method and apparatus for adjusting the angle phase relationship of light transmitted through an extended diffraction grating and two or more index diffraction gratings in a displacement measuring system. Each of the index diffraction gratings coacts with part of the extended grating to produce varying gray levels which are a function of relative grating position. The extended diffraction grating is capable of movement parallel to the index diffraction gratings. A light source illuminates the sets of diffraction gratings to produce variable gray levels. An optical lens is movably disposed between the light source and the sets of diffraction gratings to refract beams of light from the source and cause them to pass through the extended diffraction grating and impinge on the index gratings at suitable relative angles in order to achieve a precise angle phase shift in the variable gray levels. Photodetectors are disposed in the light beam path beyond the sets of gratings to detect light intensity as it varies over time. Appropriate electronic circuitry can be utilized to indicate the direction and extent of relative displacement.

The gratings employed in the present invention are amplitude gratings which are constructed in the usual manner to provide optimum fringe visibility, that is, each grid consists of a stable transparent plate having on one surface a set of parallel opaque rulings of a given width, each ruling being separated from the next by a clear transparent space of substantially equal width, thus forming a grid pattern of repeated period. It will, of course, be understood that gratings bearing radial rulings are to be employed in systems intended for angular measurement; the present discussion, however, is limited to linear measuring devices in view of the equivalence between the two types of systems.

Unlike previous systems which require precise alignment of index diffraction gratings with extended gratings to obtain desired angle phase shifts of signals generated by the photodetectors, the present invention relies on an optical lens to refract light onto diffraction gratings in such manner as to compensate for positional inaccuracies due to broad tolerances of manufacture of one or more of the index diffraction gratings.

When a convex lens is positioned in an optical path such that a small source of omnidirectional light is located at its focal point, beams of light from the source travel parallel to the axis after refraction. When the lens is disposed between the light source and the diffraction gratings in the present invention, such that the small light source is located at the focal point of the lens, the net effect of the lens and light source combination is as if a collimated light source were used with no lens whatever.

If the light source is positioned relative to the lens such that the light source is within the focal length of the lens, beams of light from the source diverge upon emergence from the lens. Consequently, in the present invention the light source can be positioned within the focal length of the lens causing emergent beams of light to impinge on the extended diffraction grating and on one or more index diffraction gratings at a relative angle which can be used to correct for positional inaccuracies of the gratings by increasing the angle phase relationship between the gray levels detected by the photodetectors.

Conversely, moving the light source along the optical path to a point beyond the focal point of the lens results in converging emergent beams of light impinging on the diffraction gratings, decreasing the angle phase relationship between signals generated by the photodetectors.

The present invention utilizes the directional preferences of grating pairs in a measuring system by arranging, in optical series, a small source of omnidirectional light input, such as a simple incandescent lamp; a lens; a pair of diffraction gratings comprised of at least a two-part index grating and an extended diffraction grating situated in substantially parallel planes with their respective rulings substantially parallel; and at least two photodetectors. These elements represent the basic configuration of the system, since a preferred system comprises a plurality of photodetectors to obtain comparative electrical signals useful in measuring systems. The operation of the present system, however, may be sufficiently considered in terms of the listed elements.

From the foregoing it will be appreciated that it is an object of the present invention to provide an improved displacement measuring system having an optical detection apparatus of the general character described, which however is not subject to the disadvantages of prior systems, and which consequently allows for broad-based tolerances in the manufacture of the invention. This makes manufacture of the present system less costly and more feasible than the prior systems.

Another object of the present invention is to provide a displacement measuring system suitable for determining relative displacement with great accuracy.

It is a further object of the present invention to provide a displacement measuring system having an optoelectronic detection apparatus of the general character described which is economical, simple in construction, and suitable for rapid, yet accurate displacement determination.

Other objects of the present invention in part will be obvious and in part will be pointed out hereinafter.

With these ends in view, the invention finds embodiment in certain combinations of elements and arrangements of parts by which the objects aforementioned and certain other objects are attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible embodiments of the invention.

DESCRIPTION OF THE PREFERRED EMBODIMENT

Figure 1:
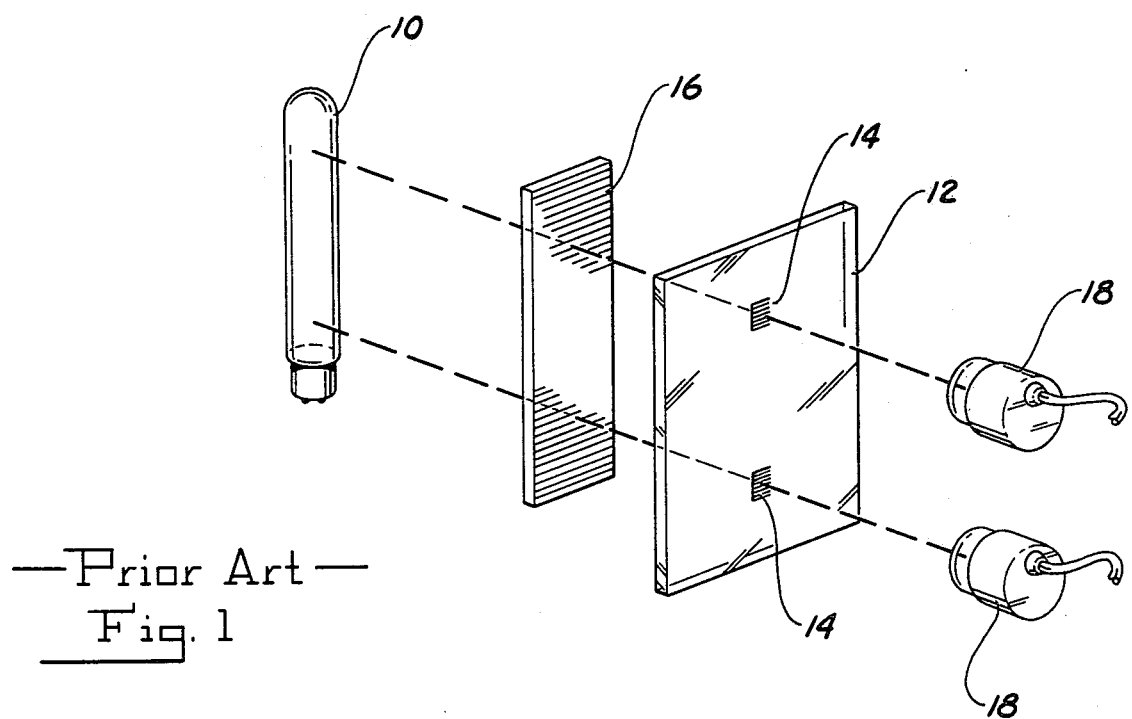
FIG. 1 is an enlarged diagrammatic representation of an optical displacement measuring system typical of the prior art.

Referring now in detail to the drawings, FIG. 1 shows the minimum components used in an optical displacement measuring system. A collimated light source 10 and a fixed grid element 12, in which are mounted two or more index diffraction gratings 14, are located on a horizontal optical path. A vertically movable extended diffraction grating 16 is parallel to the fixed grid element 12. Electric photodetectors 18 are aligned relative to the index diffraction gratings 14.

In operation, collimated beams of light are propagated to pass through the extended diffraction gratings 16 and impinge on the index diffraction gratings 14. A resulting gray level pattern is generated and projected onto the electric photodetectors 18.

Figure 2:
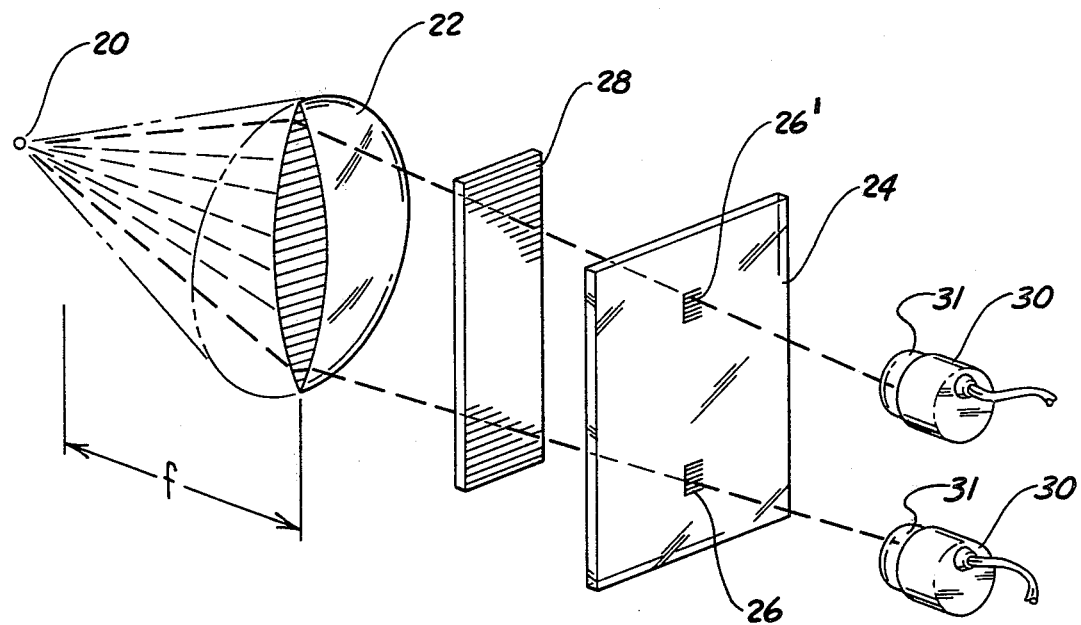
FIG. 2 is an enlarged diagrammatic view of an optical displacement measuring apparatus that incorporates the present invention.

FIG. 2 shows a typical exemplary embodiment of the present invention. A light source 20 propagates beams of light towards horizontally movable convex lens 22 which is disposed along the axis of the optical path. A fixed grid element 24, in which are mounted two or more index diffraction gratings 26, is positioned in the optical path on the side of the lens 22 opposite the light source 20. A vertically movable extended diffraction grating 28 is disposed parallel to the fixed grid element 24, intermediate the fixed grid element and the lens 22. Electric photodetectors 30 are aligned relative to the index diffraction gratings 26 and have generally larger receiving areas 31 than the area of the index diffraction gratings.

Figure 3A:
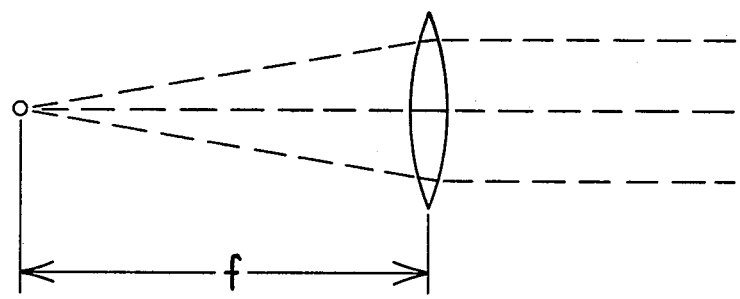
FIG. 3a is a diagrammatic view of a light source disposed at the focal point of a lens.

In operation, light beams are propagated towards the lens 22 and refracted, changing the angle of the light beams as they emerge from the lens. If the position of the lens 22 is such that the light source 20 is located at the focal point of the lens, then the light beams which emerge from the lens are collimated, as shown in FIG. 3a, and the index diffraction gratings 26 must be positioned relative to each other to produce gray level patterns out of angle phase by 90°.

Figure 3B:
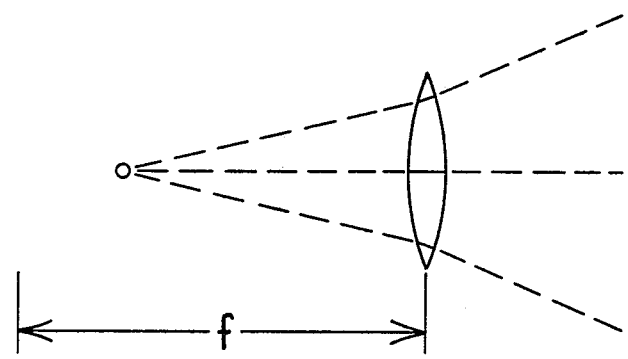
FIG. 3b is a diagrammatic view of a light source disposed within the focal plane of a lens.

Moving the lens 22 along the horizontal axis closer to the light source 20, as shown in FIG. 3b, results in diverging beams of light impinging on the index diffraction gratings 26. The resultant angle phase relationship between the gray level pattern detected by one photodetector 30 and that detected by the other photodetector is consequently increased.

Figure 3C:
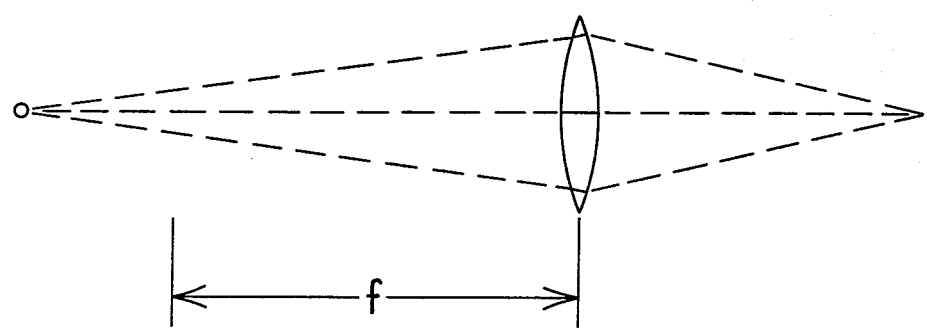
FIG. 3c is a diagrammatic view of a light source disposed outside of the focal plane of a lens.

Conversely, moving the lens 22 along the horizontal axis further from the light source 20, as shown in FIG. 3c, results in converging beams of light impinging on the index diffraction gratings 26. The resultant angle phase relationship between the gray level pattern detected by one photodetector 30 and that detected by the other photodetector is consequently decreased.

In the method hereinbefore described, precise phase angle relationships between gray level patterns can be adjusted by moving the lens 22, not the relative locations of the index diffraction gratings 26 or of the photodetectors 30.

Figure 4B:
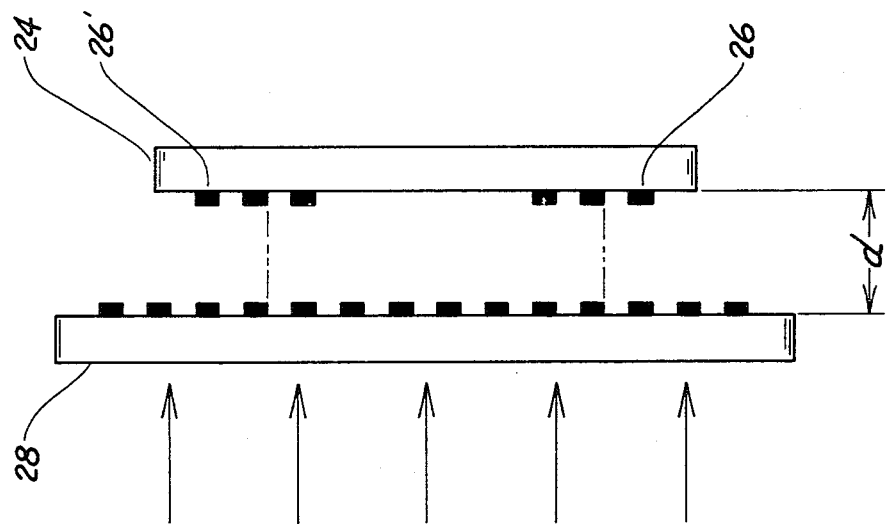
FIG. 4b is an enlarged sectional view of light beams impinging on diffraction grating sets which are 0° out of phase with respect to each other.
Figure 4A:
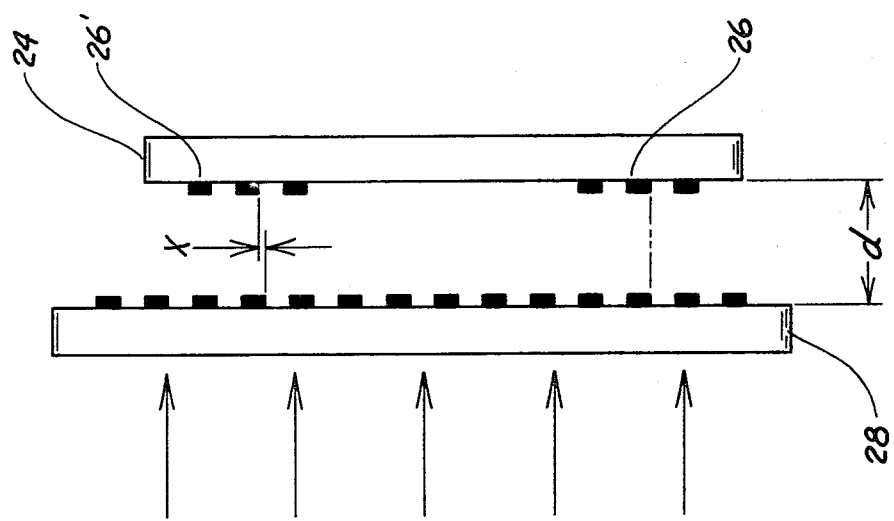
FIG. 4 a is an enlarged sectional view of light beams impinging on diffraction grating sets which are 90° out of phase with respect to each other.

FIG. 4a shows the paths of two light beams propagated by a light source, not shown. The fixed grid element 24 and the extended diffraction grating 28 are separated by a distance denoted by the letter, d. A typical exemplary distance between gratings has been shown to be approximately 0.004". The two index diffraction gratings 26 and 26' disposed on the fixed grid element 24 are 90° out of phase with respect to each other (i.e., 26 is 0° out of phase with respect to the extended diffraction grating 28. Therefore it follows that the upper index diffraction grating 26' is 90° out of phase with respect to the extended diffraction grating 28 as shown by offset dimension X. This is the optimum phase shift for quadrature dependent displacement measurement systems.

The case of the two index diffraction gratings 26 and 26' being 0° out of phase with respect to each other and with respect to the extended diffraction grating 28 is shown in FIG. 4b. This represents the greatest deviation from optimum conditions, and must be corrected in accordance with the present invention. It will be understood that any actual case can be offset no more than the case shown in FIG. 4b, and therefore that the present invention can be used to obtain optimum results when used in any like system, regardless of the relative phase shift between index diffraction gratings.

Figure 5:
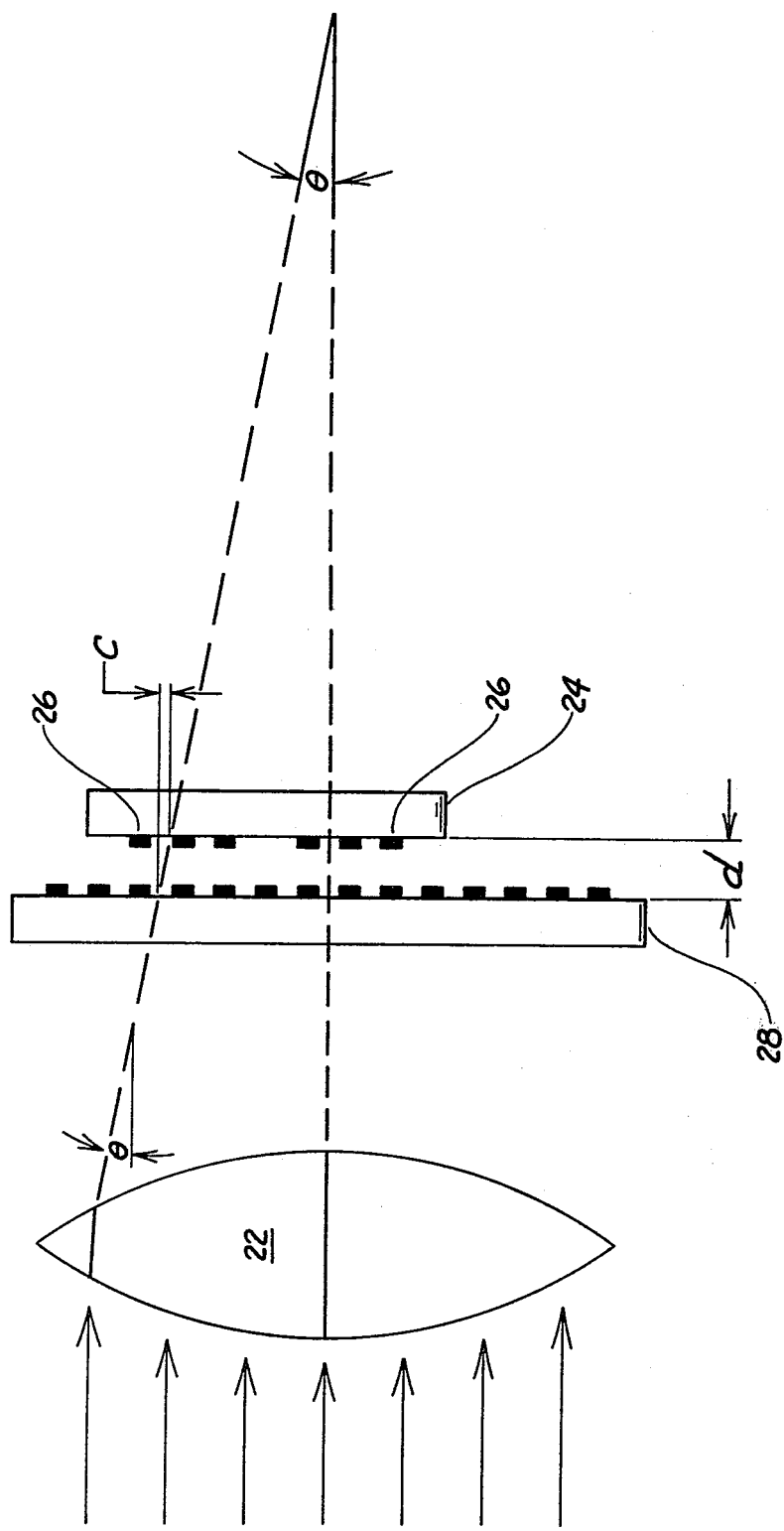
FIG. 5 is an enlarged sectional view of a lens and diffraction grating sets showing light beam paths.

Refracting the path of light impinging on gratings that are not disposed in the optimum phase relationship with respect to each other, in accordance with the present invention, results in a correction distance, denoted by the letter, c, shown in FIG. 5, between the actual light path and the path that the light would have taken had there been no refraction. A lens 22 is used to refract one of the beams of light relative to the other, prior to impingement on the extended diffraction grating 28. The relative angle between the two beams of light impinging on the extended diffraction grating 28 is denoted by the angle $\theta$. Adjusting the angle $\theta$ as hereinafter described results in generating a gray level pattern in a system of diffraction gratings all 0° out of phase with respect to each other that is substantially equal to the gray level pattern that results when index diffraction gratings are 90° out of phase with respect to each other.

The phase relation between gray level patterns generated by the beams of light is thus a function both of the distance between diffraction gratings 24, 28 and the angle of incidence of light impinging on the gratings. The correction distance, c, between the actual path of light and the optimum path thereof is computed as follows:

$$c = d \tan \theta$$

where d is the distance between diffraction gratings, $\theta$ is the relative angle of incidence between two light beams and c is the correction distance of emergent light beams.

The foregoing embodiment has been presented for the purpose of illustration and should not be taken to limit the scope of the present invention. It will be apparent that such embodiment is capable of many variations and modifications which are likewise to be included within the scope of the present invention as set forth in the appended claims.

What is claimed is:

1. In a displacement measuring system, apparatus for producing variable gray level patterns, and adjusting the angle phase difference of transmitted light producing said patterns, the combination comprising:
   (a) a small area light source for providing a source of light beams;
   (b) an index diffraction grating with at least two windows in substantial quadrature with respect to each other and disposed adjacent said light source for receiving light beams from said light source;
   (c) an extended diffraction grating adjacent to, and substantially parallel with, said index diffraction grating, and intermediate said light source and said index diffraction grating, said extended diffraction grating being capable of relative motion with respect to said index diffraction grating to coact with said index diffraction grating to produce a gray level pattern for each of said two windows when said light beams impinge on said index diffraction grating;
   (d) photodetector means for receiving said gray level pattern produced by said diffraction gratings and in response thereto, producing electrical output signals which vary in phase with said gray level pattern in accordance with any relative movement between said extended diffraction grating and said index diffraction grating; and
   (e) refraction means disposed intermediate said light source and said diffraction gratings for refracting said light beams before they impinge on said diffraction gratings, said refraction means being movably disposed between said light source and said diffraction gratings for refracting said light beams before said beams impinge on said diffraction gratings.

2. The apparatus as defined by claim 1 wherein said refraction means is a lens.

3. The apparatus as defined by claim 1 wherein said light source is movably disposed with respect to said refraction means such that said light source may be positioned with respect to a focal point of said refraction means.

4. A method for producing electrical output signals in accordance with optically generated variable gray level patterns, the method comprising the steps of:
   (a) generating a number of light beams;
   (b) transmitting the light beams to diffraction gratings including an extended diffraction grating and on index diffraction grating having at least two windows in substantial quadrature with respect to each other;
   (c) generating a gray level pattern for each of the two windows when the light beams impinge on the diffraction gratings;
   (d) receiving the gray level patterns generated by the diffraction gratings and in response thereto producing electrical output signals which vary in accordance with the changes in the gray level patterns caused by any relative movement between the diffraction gratings;
   (e) refracting the light beams before they impinge on the diffraction grating and
   (f) adjusting the amount of refraction of the light beams.

5. In a displacement measuring system, apparatus for producing variable gray level patterns, and adjusting the angle phase difference of transmitted light producing said patterns, the combination comprising:
   (a) a small area light source for providing a source of light beams;
   (b) an index diffraction grating with at least two windows in substantial quadrature with respect to each other and disposed adjacent said light source for receiving light beams from said light source;
   (c) an extended diffraction grating adjacent to, and substantially parallel with, said index diffraction grating, and intermediate said light source and said index diffraction grating, said extended diffraction grating being capable of relative motion with respect to said index diffraction grating to coact with said index diffraction grating to produce a gray level pattern for each of said two windows when said light beams impinge on said index diffraction grating;
   (d) photodetector means for receiving said gray level pattern produced by said diffraction gratings and in response thereto, producing electrical output signals which vary in phase with said gray level pattern in accordance with any relative movement between said extend diffraction grating and said index diffraction grating; and
   (e) refraction means disposed intermediate said light source and said diffraction gratings for refracting said light beams before they impinge on said diffraction gratings, said light source being movably disposed with respect to said refraction means such that said light source may be positioned with respect to a focal point of said refraction means.

* * * * *

UNITED STATES PATENT AND TRADEMARK OFFICE
CERTIFICATE OF CORRECTION

PATENT NO. : 4,231,662
DATED : November 4, 1980
INVENTOR(S) : Seymour Feinland and David Kleinschmitt It is certified that error appears in the above—identified patent and that said Letters Patent is hereby corrected as shown below:

Column 1, line 18-19 after "each" insert -- of --.

Column 1, line 22 change "photodector" to -- photodetector --.

In the Claims:

Column 6, line 13 Claim 4; change "on" to -- an --.

Column 6, line 55 Claim 5; change "extend" to -- extended --.

Signed and Sealed this

Twenty-seventh Day of October 1981

[SEAL]

Attest:

Attesting Officer

GERALD J. MOSSINGHOFF

Commissioner of Patents and Trademarks